(12) United States Patent
Sakaguchi et al.

(10) Patent No.: US 7,765,292 B2
(45) Date of Patent: Jul. 27, 2010

(54) NETWORK MONITORING SYSTEM

(75) Inventors: Hiroyuki Sakaguchi, Kanagawa (JP); Hideo Iwamoto, Hiroshima (JP); Toru Domon, Hokkaidou (JP); Yuta Aono, Kanagawa (JP)

(73) Assignee: Evolium S.A.S., Paris (FR)

( * ) Notice: Subject to any disclaimer, the term of this patent is extended or adjusted under 35 U.S.C. 154(b) by 862 days.

(21) Appl. No.: 11/142,252

(22) Filed: Jun. 2, 2005

(65) Prior Publication Data
US 2006/0036729 A1 Feb. 16, 2006

(30) Foreign Application Priority Data
Jul. 15, 2004 (JP) ............... 2004-208169

(51) Int. Cl.
*G06F 15/177* (2006.01)
*G06F 15/173* (2006.01)
*H04W 4/00* (2009.01)

(52) U.S. Cl. ................ 709/224; 709/223; 370/329; 370/338

(58) Field of Classification Search ............ 709/223, 709/224; 370/329, 338
See application file for complete search history.

(56) References Cited

U.S. PATENT DOCUMENTS
2004/0024859 A1* 2/2004 Bloch et al. ............... 709/223
2004/0249923 A1* 12/2004 Ko et al. ................... 709/223

FOREIGN PATENT DOCUMENTS
WO    WO 99/18695    4/1999

OTHER PUBLICATIONS
Patent Abstracts of Japan, Japanese Patent Publication No. 11-261471 dated Sep. 24, 1999.

* cited by examiner

*Primary Examiner*—George C Neurauter, Jr.
*Assistant Examiner*—Anish Sikri
(74) *Attorney, Agent, or Firm*—Sughrue Mion, PLLC

(57) ABSTRACT

To provide a network monitoring system extracting the performance measurement data while eliminating the performance measurement data that is not effective for improvement of the network performance on the basis of a predetermined extraction condition and presenting the extraction result to the operator. The network monitoring system includes extraction condition presenting means for presenting a predetermined extraction condition indicating a relationship between performance measurement data of each device configuring the network and a status of a device to be eliminated upon extracting said performance measurement data; and performance measurement data extracting means for eliminating the performance measurement data that is measured under a status of the device to be eliminated on the basis of an extraction condition indicated by said extraction condition presenting means and extracting the performance measurement data that is effective for improvement of the network performance.

11 Claims, 8 Drawing Sheets

FIG.3
STATUS NOTIFICATION DATABASE

| NAME OF DEVICE | DEVICE ID | FUNCTION BOARD NAME | POSITION | STATUS NAME | OCCURRENCE AND RECOVERY | TIME |
|---|---|---|---|---|---|---|
| NODE B | 000001 | BB | 1 | LOCK | ON | 2003/12/06 21:00:30 |
| NODE B | 000001 | BB | 1 | LOCK | OFF | 2003/12/06 21:05:00 |
| NODE B | 000001 | E1 | 2 | ACT | OFF | 2003/12/06 20:30:00 |
| NODE B | 000001 | E1 | 2 | ACT | ON | 2003/12/06 20:40:00 |
| RNC | 001001 | STM-1 | 1-0 | LOS | ON | 2003/12/06 21:00:00 |
| RNC | 001001 | STM-1 | 1-0 | LOS | OFF | 2003/12/06 21:05:00 |
| RNC | 001001 | STM-1 | 1-1 | LOF | ON | 2003/12/06 22:40:00 |
| RNC | 001001 | STM-1 | 1-1 | LOF | OFF | 2003/12/06 22:50:00 |
| RNC | 001001 | STM-1 | 1-1 | VP-AIS | ON | 2003/12/06 23:10:00 |
| RNC | 001001 | STM-1 | 1-1 | VP-AIS | OFF | 2003/12/06 23:15:00 |
| RNC | 001001 | STM-1 | 1-1 | ALCAP CLOSING | ON | 2003/12/06 23:20:00 |
| RNC | 001001 | STM-1 | 1-1 | ALCAP CLOSING | OFF | 2003/12/06 23:23:00 |
| RNC | 001001 | STM-1 | 1-1 | LOS | ON | 2003/12/07 07:45:00 |
| RNC | 001001 | STM-1 | 1-1 | LOS | OFF | 2003/12/07 08:10:00 |

FIG. 4
PERFORMANCE MEASUREMENT DATABASE

| DEVICE ID | MEASUREMENT DATA NAME | MEASUREMENT FUNCTION BOARD NAME | MEASUREMENT POSITION | MEASUREMENT DATA VALUE | TIME |
|---|---|---|---|---|---|
| 000001 | BER | E1 | 2 | $10^{-7}$ | 2003/12/06 20:45:00 |
| 001001 | LOSS PROBABILITY | STM-1 | 1-0 | 90% | 2003/12/06 21:01:00 |
| 001001 | DATA TRANSMISSION LOAD FACTOR | STM-1 | 1-0 | 0% | 2003/12/06 21:02:00 |
| 001002 | LOSS PROBABILITY | STM-1 | 1-1 | 1% | 2003/12/06 22:00:00 |
| 001001 | LOSS PROBABILITY | STM-1 | 1-1 | 100% | 2003/12/06 22:41:00 |
| 001001 | LOSS PROBABILITY | STM-1 | 1-1 | 100% | 2003/12/06 22:42:00 |
| 001001 | LOSS PROBABILITY | STM-1 | 1-1 | 100% | 2003/12/06 22:43:00 |
| 001001 | LOSS PROBABILITY | STM-1 | 1-1 | 100% | 2003/12/06 22:44:00 |
| 001001 | LOSS PROBABILITY | STM-1 | 1-1 | 100% | 2003/12/06 22:45:00 |
| 001001 | LOSS PROBABILITY | STM-1 | 1-1 | 100% | 2003/12/06 23:11:00 |
| 001001 | LOSS PROBABILITY | STM-1 | 1-1 | 100% | 2003/12/06 23:22:00 |
| 001001 | CHANNEL LOAD FACTOR | STM-1 | 1-1 | 0% | 2003/12/07 08:05:00 |

FIG. 5

TABLE

| MEASUREMENT DATA NAME | STATUS NAME |
|---|---|
| LOSS PROBABILITY | LOS |
| LOSS PROBABILITY | LOF |
| LOSS PROBABILITY | VP-AIS |
| LOSS PROBABILITY | ALCAP CLOSING |
| CHANNEL LOAD FACTOR | LOS |

NETWORK MONITORING SYSTEM

TECHNICAL FIELD

The present invention relates to a network monitoring system that monitors a network on the basis of performance measurement data and status notification data that are transmitted from respective devices constructing the network; and more specifically, the present invention relates to a network monitoring system that enables to extract the performance measurement data transmitted from respective devices while eliminating the performance measurement data having no effect on improvement of the performance of the network. The invention is based on a priority application JP 2004-208169 which is hereby incorporated by reference.

BACKGROUND ART

A conventional network monitoring system receives the performance measurement data and the status notification data in huge quantities that are constantly transmitted from the respective devices constructing the network. An operator, who monitors the network, improves the performance of the network by changing a device parameter of each device or expanding the processing abilities on the basis of the performance measurement data and the status notification data that are received by the network monitoring system.

However, the performance measurement data received by the network monitoring system includes the data that are not effective for improving the performance of the network. For example, it includes the performance measurement data that is measured in deterioration of the network caused by a fault that occurs to one of the devices and a fault that occurs to a transmission line connecting the devices to one another. In such a case, improvement of the network performance is not achieved by changing the device parameter of the device or expanding the processing abilities or the like. Therefore, the operator needs to eliminate the performance measurement data that is not effective for improvement of the network performance.

According to the conventional network monitoring system, the performance measurement data and the status notification data of each device are collected separately. Therefore, the operator checks whether or not a time, when the performance measurement data of each device is measured, is in a period of time, when a fault of the device or a fault of the network occurs, referring to a history of the status notification data of each device in accordance with know how that the operator has. Then, the operator filters the received performance measurement data by eliminating the performance measurement data that is not effective for improvement of the network performance. Such operation for eliminating the performance measurement data requires lots of steps and lots of manpower.

The operator analyzes the filtered performance measurement data after such filtering of the performance measurement data, and maintains the performance of the network optimum by setting a parameter of each device constructing the network at an optimum value, changing the construction of the network, or expanding the device processing abilities or the like.

[Patent Reference 1] Japanese Patent Application Laying Open (KOHYO) No. 2001-519619

[Patent Reference 2] Japanese Patent Application Laying Open (KOKAI) No. 11-261471

DISCLOSURE OF THE INVENTION

[Problem to be Solved by the Invention]

The present invention has been made taking the foregoing problems into consideration, and an object of which is to provide a network monitoring system extracting the performance measurement data while eliminating the performance measurement data that is not effective for improvement of the network performance on the basis of a predetermined extraction condition and presenting the extraction result to the operator, without the need for the operator himself or herself, who monitors the network, to perform the operation to decide the performance measurement data to be eliminated from the extraction target while referring to the device states as a conventional case.

[Means of Solving the Problems]

According to a first aspect of the present invention, a network monitoring system may comprise extraction condition presenting means for presenting a predetermined extraction condition indicating a relationship between performance measurement data of each device configuring the network and a status of a device to be eliminated upon extracting the performance measurement data; and performance measurement data extracting means for eliminating the performance measurement data that is measured under a status of the device to be eliminated on the basis of an extraction condition indicated by the extraction condition presenting means and extracting the performance measurement data that is effective for improvement of the network performance;

whereby the network monitoring system provides performance measurement data that is effective for improvement of a network performance to an operator monitoring the network.

According to such a configuration, without the need for the operator himself of herself to perform the operation to decide the performance measurement data to be eliminated from the extraction target while referring to the device states, the operator can be presented the performance measurement data that is effective for improvement of the network performance.

According to a second aspect of the present invention, a network monitoring system for monitoring a performance of the network on the basis of the performance measurement data and status notification data that are transmitted from each device configuring the network may comprise a monitor terminal of an operator who monitors a network and a network monitoring device that is connected to the network;

whereby the network monitoring device comprises data communication processing means enabling the communication with each device configuring the network and communication with the monitor terminal of the operator; performance measuring database for storing the performance measurement data of each device that is received via the data communication processing means; status notification database for storing the status notification data of each device that is received via the data communication processing means; a table for indicating a predetermined extraction condition; and extraction and aggregate processing means for extracting the performance measurement data from the performance measurement database on the basis of a predetermined extraction condition indicated on the table with reference to the status notification database, performing the aggregate processing of the extracted performance measurement data, and transmitting the extracted performance measurement data and the aggregate processing data to the monitor terminal via the data communication processing means; and the predetermined extraction condition indicates a relationship between the performance measurement data and the status of the device to be eliminated upon extraction.

According to such a configuration, since extraction and aggregate processing means extracts the performance measurement data from the performance measurement database on the basis of a predetermined extraction condition to indicate the status of the device to be eliminated indicated on the table upon extracting the performance measurement data, without the need for the operator himself of herself to perform the operation to decide the performance measurement data to be eliminated from the extraction target while referring to the device states, the operator can extract the performance measurement data promptly and simply.

According to a third aspect of the present invention, the predetermined extraction condition is presented on the monitor terminal and can be set or changed by the operator; the extraction condition, that is set or changed by the operator, is transmitted to the network monitoring device from the monitoring terminal via the data communication processing means; and this extraction condition is stored in the table.

According to such a configuration, the operator can freely set or change an extraction condition to be presented to a monitor terminal, so that the operator can simply set or change the extraction condition of more effective performance measurement data to improvement of the performance of the network.

According to a fourth aspect of the present invention, the aggregate processing includes temporal change of the extracted performance measurement data; the data communication processing means transmits the temporal change of the performance measurement data and the status of the corresponding device to the monitoring device; and the monitoring device presents the transmitted temporal change of the performance measurement data and the transmitted status of the corresponding device to the operator.

According to such a configuration, the temporal change of the performance measurement data and the status of the corresponding device are presented to the operator, so that the operator can easily recognize a relationship between the time-dependent status change of the device and the performance measurement data at the time and can analyze the performance measurement data with a high degree of accuracy.

According to a fifth aspect of the present invention, the aggregate processing includes the aggregate data including at least one of total, average, the maximum value, and the minimum value of the extracted performance measurement data; the data communication processing means transmits the aggregate data to the monitoring device in addition to the temporal change of the performance measurement data and the status of the corresponding device; and the monitoring device presents the temporal change of the performance measurement data, the status of the corresponding device, and the aggregate data, which are transmitted, to the operator.

According to such a configuration, in addition to the temporal change of the performance measurement data and the status of the corresponding device, the aggregate data including at least one of total, average, the maximum value, and the minimum value of the extracted performance measurement data is presented to the operator, so that the operator can analyze the performance measurement data with a high degree of accuracy while referring to the aggregate data.

BEST MODE FOR CARRYING OUT THE INVENTION

FIG. 1 illustrates a network monitoring system according to the present invention, and a schematic configuration of a network that is monitored by this network monitoring system.

The network monitoring system is provided with a network monitoring device 10, and monitor terminals 20-1, 20-2, and 20-3 of the operator to monitor the network.

The network that is monitored by this network monitoring system may include a MSC (Mobile Switching Center) 30, RNC (Radio Network Controllers) 40, 41, 42 and 43, Nodes B 50-1 to 50-3, 51-1 to 51-3, 52-1 to 52-3 and 53-1 to 53-3, and a mobile radio terminal (not illustrated), and thereby, voice or the data such as packet data can be transmitted and received between the devices to be connected to the network.

The mobile radio terminal (not illustrated) may communicate with any of the Nodes B 50-1 to 53-3 via the radio. The Nodes B 50-1 to 50-3 are connected to the RNC 40, the Nodes B 51-1 to 51-3 are connected to the RNC 41, the Nodes B 52-1 to 52-3 are connected to the RNC 42, and the Nodes B 53-1 to 53-3 are connected to the RNC 43, respectively. Respective RNC 40 to 43 are connected each other and are also connected to the MSC 30. The network monitoring device 10 is connected to the MSC 30 and the monitoring terminals 20-1 to 20-3. The monitoring terminals 20-1 to 20-3 may provide a graphic user interface (GUI) to an operator, and may present the performance measurement data for monitoring the performance of the network and the status of the relevant device or the like to be transmitted from the network monitoring device 10, and further, may transmit the input from the operator such as setting or changing of an extraction condition of the performance measurement data to the network monitoring device 10.

The network monitoring system may define the MSC 30, the RNC 40 to 43, and the Nodes B 50-1 to 53-3 as a monitoring target.

FIG. 2 illustrates an example of inner configurations of the network monitoring system 10 and the monitor terminal 20-1 to 20-3.

The network monitoring system 10 may have a data communication processing part 11, a performance measurement database 12, a status notification database 13, a table 14 as extraction condition presenting means, data extraction and aggregate processing means 15 as performance measurement data extracting means, and an extraction/aggregate data storing memory part 16 in an inner memory area for the operation.

The monitoring terminals 20-1 to 20-3 have an extraction condition setting GUI part 21.

The data communication processing part 11 may receive the status notification data (the data relevant to the status change, or the alarm notification) and the performance measurement data from each device of a monitoring target (for example, the MSC 30, the RNC 40 to 43, and the Node B 50-1 to 53-3 shown in FIG. 1) via the MSC 30, may receive the input of the operator from the extraction condition setting GUI part 21 of the monitoring terminals 20-1 to 20-3, and may transmit the data to be presented to the operator to the extraction condition setting GUI part 21 of the monitoring terminals 20-1 to 20-3.

The performance measurement data of each device configuring the network that is received via the data communication processing part 11 is stored in the performance measurement database 12, and in the same way, the status notification data is stored in the status notification database 13. In addition, a predetermined extraction condition indicating a relationship between the performance measurement data and the status of the device to be eliminated upon extraction is stored in the table 14.

The data extraction and aggregate processing means 15 is connected to each constituent element of the network monitoring system 10, extracts the performance measurement data from the performance measurement database 12 with reference to the status of each device that is stored in the status notification database 13 on the basis of the predetermined performance measurement data to be indicated on the table 14, and carries out the aggregate processing (calculation or extraction of total, average, the maximum value, and the minimum value) with respect to the extracted performance measurement data.

The extraction/aggregate data storing memory part 16 is connected to the data extraction and aggregate processing means 15 to store the extracted performance measurement data and the aggregated and processed data.

The extraction condition setting GUI part 21 included in the monitor terminals 20-1 to 20-3 is connected to the data extraction and aggregate processing means 15 to present the data stored in the extraction/aggregate data storing memory part 16 to the operator by displaying it on the GUI of the monitor terminals 20-1 to 20-3.

When the extraction condition is set or changed according to the operation by the operator, the extraction condition setting GUI part 21 may transmit the set or changed extraction condition to the data communication processing part 11 of the network monitoring system 10. The set or changed extraction condition is stored in the table 14. The data extraction and aggregate processing means 15 may extract the performance measurement data and may carry out the aggregate processing of the extracted performance measurement data on the basis of the set or changed extraction condition stored in the table 14 to store the obtained data again in the extraction/aggregate data storing memory part 16.

These data stored in the extraction/aggregate data storing memory part 16 is presented to the operator again on the extraction condition setting GUI part 21 of the monitor terminals 20-1 to 20-3.

Next, the data to be stored in the performance measurement database 12 and the status notification database 13, and a predetermined extraction condition to be stored in the table 14 will be described in detail below with reference to FIGS. 3 to 5.

FIG. 3 illustrates an example of the status notification data from the device of the monitoring target to be stored in the status notification database 13. According to an example shown in FIG. 3, the status notification data may include a name of a device, a device ID, a function board name, a position, a status name, occurrence and recovery, and a time.

The status notification data shown in FIG. 3 represents the following status.

In a function board BB (Base Band) located at a position 1 of a Node B with the device ID of 000001, a lock status (a status that the operation of this board is stopped) occurs at 21:00:30 on Dec. 6, 2003, and the lock status is unlocked at 21:05:00 on Dec. 6, 2003.

In a function board E1(E1 of a PDH line class) located at a position 2 of a Node B with the device ID of 000001, an operating status is turned OFF (the normal operation is not performed) at 21:30:00 on Dec. 6, 2003, and the operating status is turned ON (the normal operation is performed) at 20:40:00 on Dec. 6, 2003.

A function board STM-1 (STM-1 of a SDH line class) located at a position 1-0 of RNC with the device ID of 001001 is turned into a LOS status (a lost of signal status, namely, the status that a signal is not supplied from a line) at 21:00:00 on Dec. 6, 2003, and the LOS status is evaded at 21:05:00 on Dec. 6, 2003.

A function board STM-1 located at a position 1-1 of RNC with the device ID of 001001 is turned into a LOF status (a lost of frame status) at 22:40:00 on Dec. 6, 2003, and the LOF status is evaded at 22:50:00 on Dec. 6, 2003.

A function board STM-1 located at a position 1-1 of RNC with the device ID of 001001 is turned into a VP-AIS status (Virtual Path Alarm Indication Signal status, namely, a status that VP-AIS cell cannot be received) at 23:10:00 on Dec. 6, 2003, and the VP-AIS status is evaded at 23:15:00 on Dec. 6, 2003.

A function board STM-1 located at a position 1-1 of RNC with the device ID of 001001 is turned into an ALCAP CLOSING status (a status that a link of ALCAP of a signaling is disconnected) at 23:20:00 on Dec. 6, 2003, and the ALCAP CLOSING status is evaded at 23:23:00 on Dec. 6, 2003.

A function board STM-1 located at a position 1-1 of RNC with the device ID of 001001 is turned into a LOS status at 7:45:00 on Dec. 7, 2003, and the LOS status is evaded at 8:10:00 on Dec. 7, 2003.

In addition, FIG. 4 illustrates an example of the performance measurement data from the device of the monitoring target to be stored in the performance measurement database 12. According to the example shown in FIG. 4, the performance measurement data may include a device ID, a measurement data name, a measurement function board name, a measurement position, a measurement data value, and a time.

A relationship between the content of the performance measurement data shown in FIG. 4 and the status of the device shown in FIG. 3 will be described below.

A BER (bit error rate) at a measurement position 2 of a measurement function board name E1 of a device with a device ID, 000001 is $10^{-7}$ at 20:45:00 on Dec. 6, 2003. This performance measurement data is not measured under the status of the device shown in FIG. 3.

A loss probability at the measurement position 1-0 of the measurement function board name STM-1 of the device with the device ID, 001001 is 90% at 21:01:00 on Dec. 6, 2003. This performance measurement data is measured in the LOS status of the RNC shown in FIG. 3.

A data transmission load factor at the measurement position 1-0 of the measurement function board name STM-1 of the device with the device ID, 001001 is 0% at 21:02:00 on Dec. 6, 2003. This performance measurement data is measured in the LOS status of the RNC shown in FIG. 3.

A loss probability at the measurement position 1-0 of the measurement function board name STM-1 of the device with the device ID, 001002 is 1% at 22:00:00 on Dec. 6, 2003. This performance measurement data is not measured in the status shown in FIG. 3.

A loss probability at the measurement position 1-1 of the measurement function board name STM-1 of the device with the device ID, 001001 is 100% at 22:41:00 on Dec. 6, 2003. This performance measurement data is measured in the LOF status of RNC shown in FIG. 3.

A loss probability at the measurement position 1-1 of the measurement function board name STM-1 of the device with the device ID, 001001 is 100% at 22:42:00 on Dec. 6, 2003. This performance measurement data is measured in the LOF status of RNC shown in FIG. 3.

A loss probability at the measurement position 1-1 of the measurement function board name STM-1 of the device with the device ID, 001001 is 100% at 22:43:00 on Dec. 6, 2003. This performance measurement data is measured in the LOF status of RNC shown in FIG. 3.

A loss probability at the measurement position 1-1 of the measurement function board name STM-1 of the device with the device ID, 001001 is 100% at 22:44:00 on Dec. 6, 2003. This performance measurement data is measured in the LOF status of RNC shown in FIG. 3.

A loss probability at the measurement position 1-1 of the measurement function board name STM-1 of the device with the device ID, 001001 is 100% at 22:45:00 on Dec. 6, 2003. This performance measurement data is measured in the LOF status of RNC shown in FIG. 3.

A loss probability at the measurement position 1-1 of the measurement function board name STM-1 of the device with the device ID, 001001 is 100% at 23:11:00 on Dec. 6, 2003. This performance measurement data is measured in the VP-AIS status of RNC shown in FIG. 3.

A loss probability at the measurement position 1-1 of the measurement function board name STM-1 of the device with the device ID, 001001 is 100% at 23:22:00 on Dec. 6, 2003. This performance measurement data is measured in the ALCAP CLOSING status of RNC shown in FIG. 3.

A channel load factor at the measurement position 1-1 of the measurement function board name STM-1 of the device with the device ID, 001001 is 0% at 8:05:00 on Dec. 7, 2003. This performance measurement data is measured in the LOS status of RNC shown in FIG. 3.

FIG. 5 illustrates an example of a relationship between a predetermined extraction condition to be stored in the table 14, namely, the performance measurement data and the status of the device to be eliminated upon extraction.

According to the example shown in FIG. 5, it is shown that the loss probability that is measured when the device is in the LOS status, the LOF status, the VP-AIS status, or the ALCAP CLOSING status, and the channel load factor that is measured when the device is in the LOS status should be eliminated.

Among the performance measurement data shown in FIG. 4, the second loss probability from above, the fifth to eleventh loss probabilities from above, and the twelfth channel load factor from the above correspond to the performance measurement data that is measured in the status of the device to be eliminated shown in FIG. 5. Therefore, for example, upon extracting the performance measurement data relevant to the loss probability, the performance measurement data stored in the table 14 in these device statuses are eliminated.

FIG. 6 illustrates a flow chart of the processing to extract the performance measurement data according to a predetermined extraction condition.

In step S1, according to the operation of the monitor terminals 20-1 to 20-3 by the operator, the network monitoring system may start the processing to extract the performance measurement data.

In step S2, the network monitoring device 10 may fetch out a data list stored in the performance measurement database 12 from a performance measurement database schema, which is an information table defining attributions of respective items of the performance measurement database 12 and may transmit the list to the monitor terminals 20-1 to 20-3 via the data communication processing part 11. The monitor terminals 20-1 to 20-3 may present the list of the data stored in the transmitted performance measurement database 12 to the operator and according to the operation of the operator, the monitor terminals 20-1 to 20-3 may select the performance measurement data to be extracted or may change the extraction conditions that are indicated on the table 14.

In step S3, the network monitoring device 10 may fetch out the designated performance measurement data from the performance measurement database 12.

In step S4, the network monitoring device 10 may eliminate the performance measurement data that is measured when the status of the device to be eliminated is occurring from the performance measurement data fetched out in the step S3 with reference to the table 14.

In step S5, the network monitoring device 10 may perform the aggregate processing such as total, average, extraction of the maximum value, and extraction of the minimum value or the like with respect to the performance measurement data that is fetched out in the step S4.

In step S6, the network monitoring device 10 may transmit the extracted performance measurement data, the corresponding status of the device, and the aggregate value obtained in the step S5 to the monitor terminals 20-1 to 20-3 via the data communication processing part 11. The monitor terminals 20-1 to 20-3 may present these transmitted data to the operator.

In step S7, the operator decides to continue or terminate the extraction processing of the performance measurement data.

In the case of continuing the processing, returning to the step S2, the performance measurement data is selected or the extraction condition is changed. In the case of terminating the processing, proceeding to step S8, the processing is ended.

FIG. 7 illustrates a screen display example of the performance measurement data to be displayed on the extraction condition setting GUI part 21 of the monitor terminals 20-1 to 20-3 and the relevant data or the like, and FIG. 8 illustrates a three dimensional graph when the extraction condition is changed.

In the screen display example shown in FIG. 7, a performance measurement data list 71, a list of the status of the device to be eliminated 72, a three dimensional graph 73 showing temporal change of a plurality of extracted performance measurement data, and an aggregate value display part displaying the aggregate value of the extracted performance measurement data 74 are indicated.

For example, the performance measurement data list 71 may include a loss probability, a channel load factor, and a bit error rate (BER) or the like. The operator selects the performance measurement data to be extracted from among this list 71.

For example, the list of the status of the device to be eliminated 72 may include the lock status (the status that the operation is stopped), the ACT off status (the normal operation is not performed), the LOS status (the lost of signal status), the LOF status (the lost of frame status), the VP-AIS status (the status that the VP-AIS cell cannot be received), and the ALCAP CLOSING status (the status that a ling of ALCAP of a signaling is disconnected) or the like. In the screen display example shown in FIG. 7, in the side of the list of the status of the device to be eliminated 72, an "ADD" button 72-1 for adding the selected device states, a "DELETE" button 72-2 for deleting the selected status of the device, and a "RETRIEVE" button 72-3 for starting the re-extraction of the performance measurement data on the basis of the extraction condition that is changed by these "ADD" button 72-1 and "DELETE" button 72-2 are displayed. The operator can set and change the status of the device to be eliminated by using these buttons 72-1, 72-2, and 72-3.

The three dimensional graph 73 indicates the temporal change of the measured value of the performance measurement data (according to the screen display example shown in FIG. 7, the loss probability, the channel load factor, and BER). In the screen display example shown in FIG. 7, the temporal change of the measured value of the loss probability is shown.

The loss probability shown in FIG. 7 has a very large value except for at the opposite ends thereof. This large value of the loss probability is measured in the case of the status of the device to be eliminated (for example, the LOF status). FIG. 8 shows a result of the fact that the LOF status is set in the list of the status of the device to be eliminated 72 and the loss probability that is measured at this LOF status is eliminated. In FIG. 8, a portion represented by a broken line corresponds to the eliminated part and it is represented by interpolation in this example.

In an aggregate value display part 74 shown in FIG. 7, an aggregate value (74-1) of the extracted performance measurement data, an average value (74-2), the maximum value (74-3), and the minimum value (74-4) are displayed. By observing the three dimensional graph 73 displayed by change of setting of the status of the device to be eliminated with reference to the aggregate value 74 to be displayed in conjunction with this three dimensional graph 73, the operator can know the effect of setting of the status of the device to be eliminated on the extracted performance measurement data.

After freely setting and changing the extraction condition by the monitor terminal 20-1 to 20-3, the operator can observe the performance measurement data that is extracted under that extraction condition. Then, the operator can maintain the performance of the network optimum by analyzing this performance measurement data.

As described above, according to the network monitoring system of the present invention, extracting the performance measurement data while eliminating the performance measurement data that is not effective for improvement of the network performance on the basis of a predetermined extraction condition, it is possible to present the extraction result to the operator promptly and simply without the need for the operator himself or herself who monitors the network to perform the operation to decide the performance measurement data to be eliminated from the extraction target while referring to the device states not as a conventional case.

Figure 1:
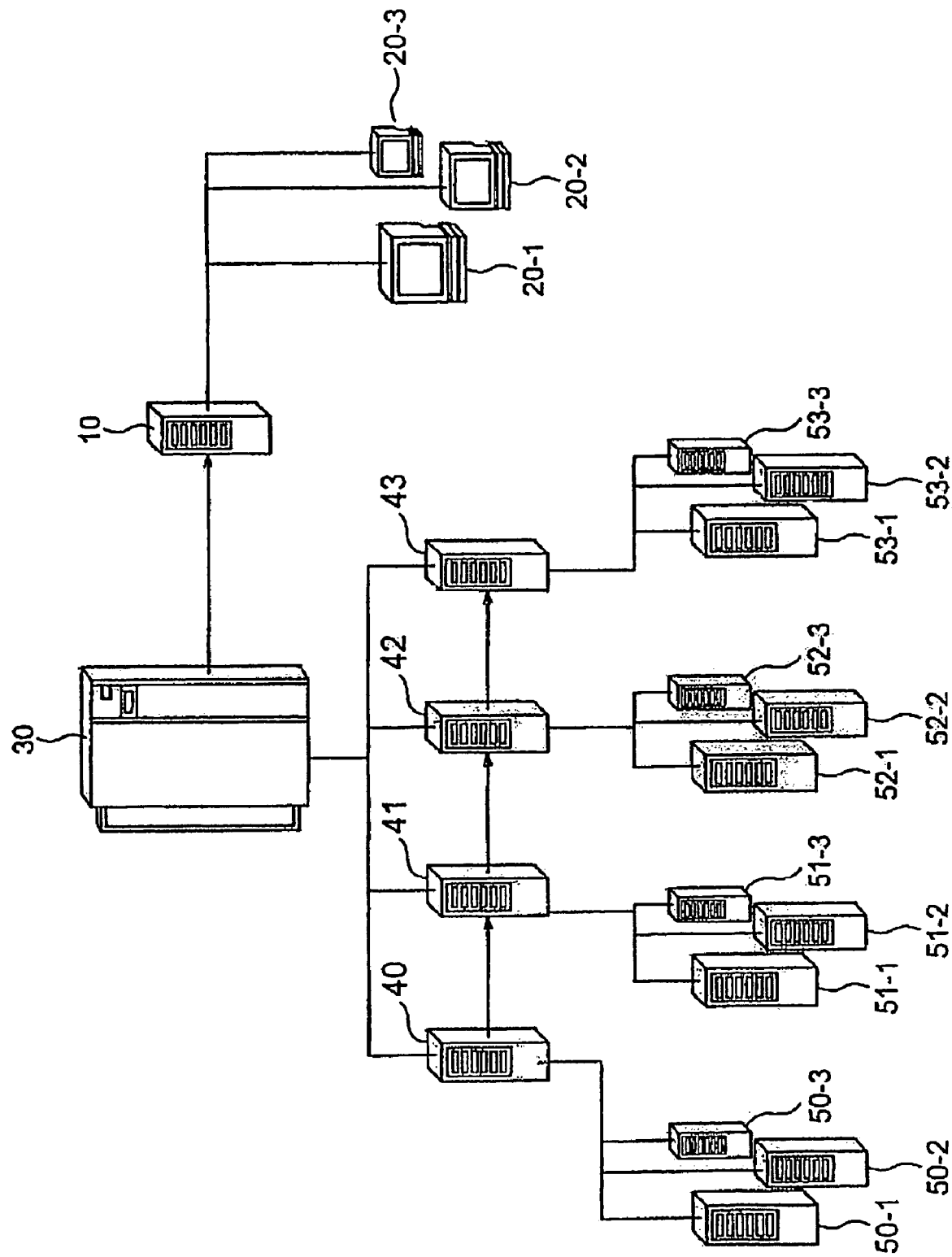
FIG. 1 A network monitoring system according to the present invention, and a schematic configuration of a network that is monitored by this network monitoring system FIG. 2 An example of inner configurations of the network monitoring system and a monitor terminal FIG. 3 An example of status notification data FIG. 4 An example of performance measurement data FIG. 5 An example of a table FIG. 6 A flow chart of the processing to extract the performance measurement data FIG. 7 A screen display example of the performance measurement data and the relevant data FIG. 8 A three dimensional graph when setting of a status of the device to be eliminated is changed
Figure 2:
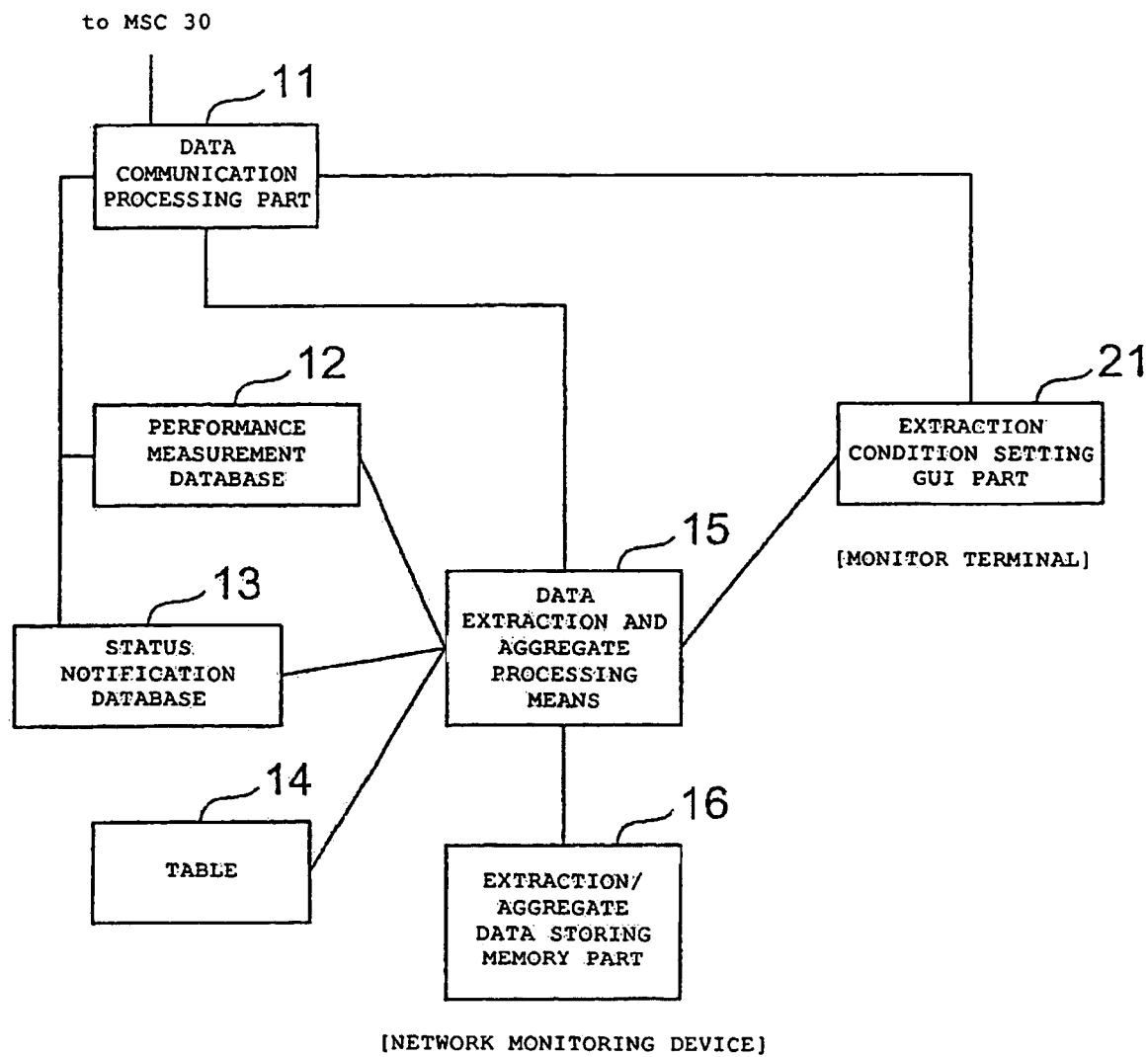
Figure 6:
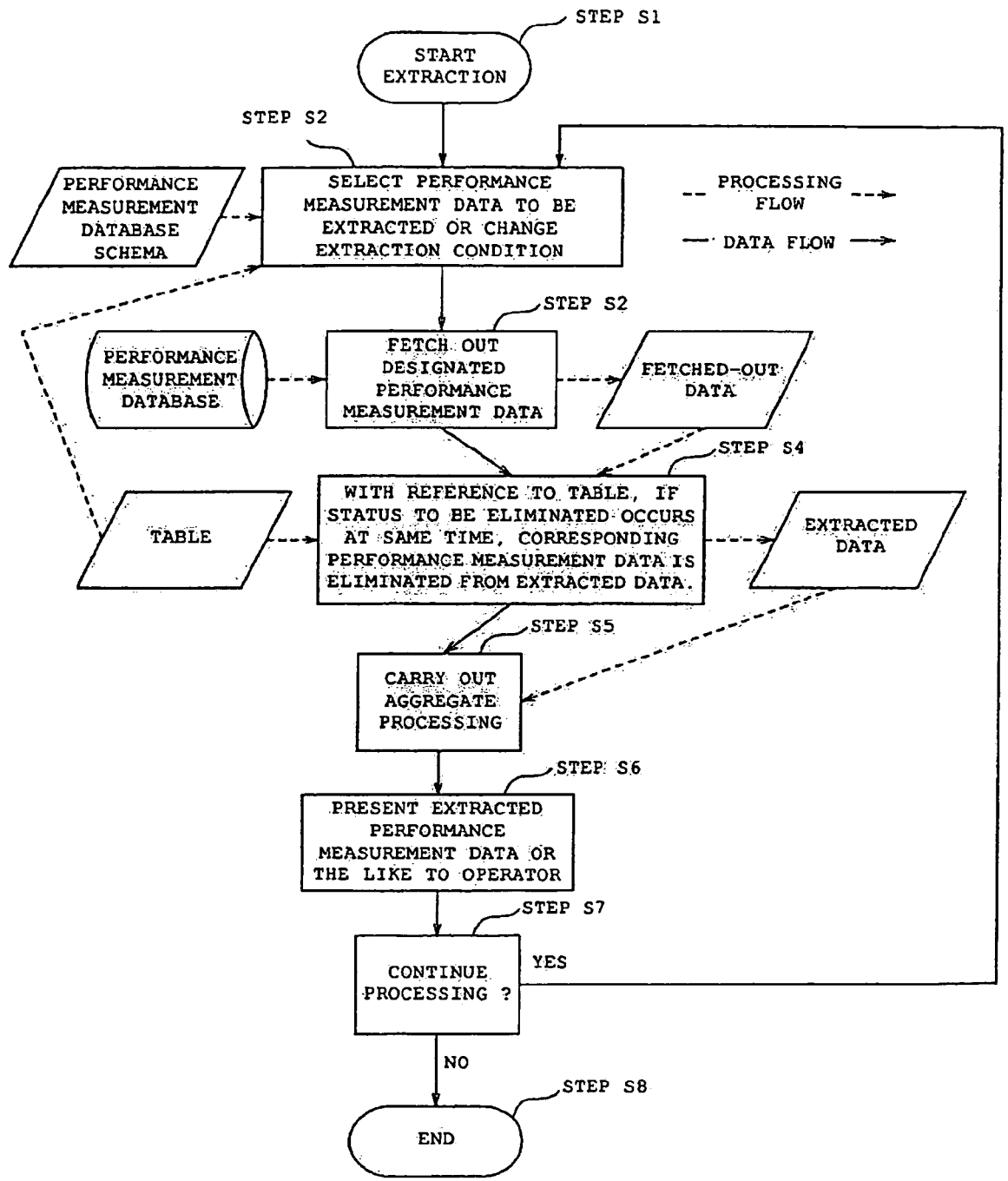
Figure 7:
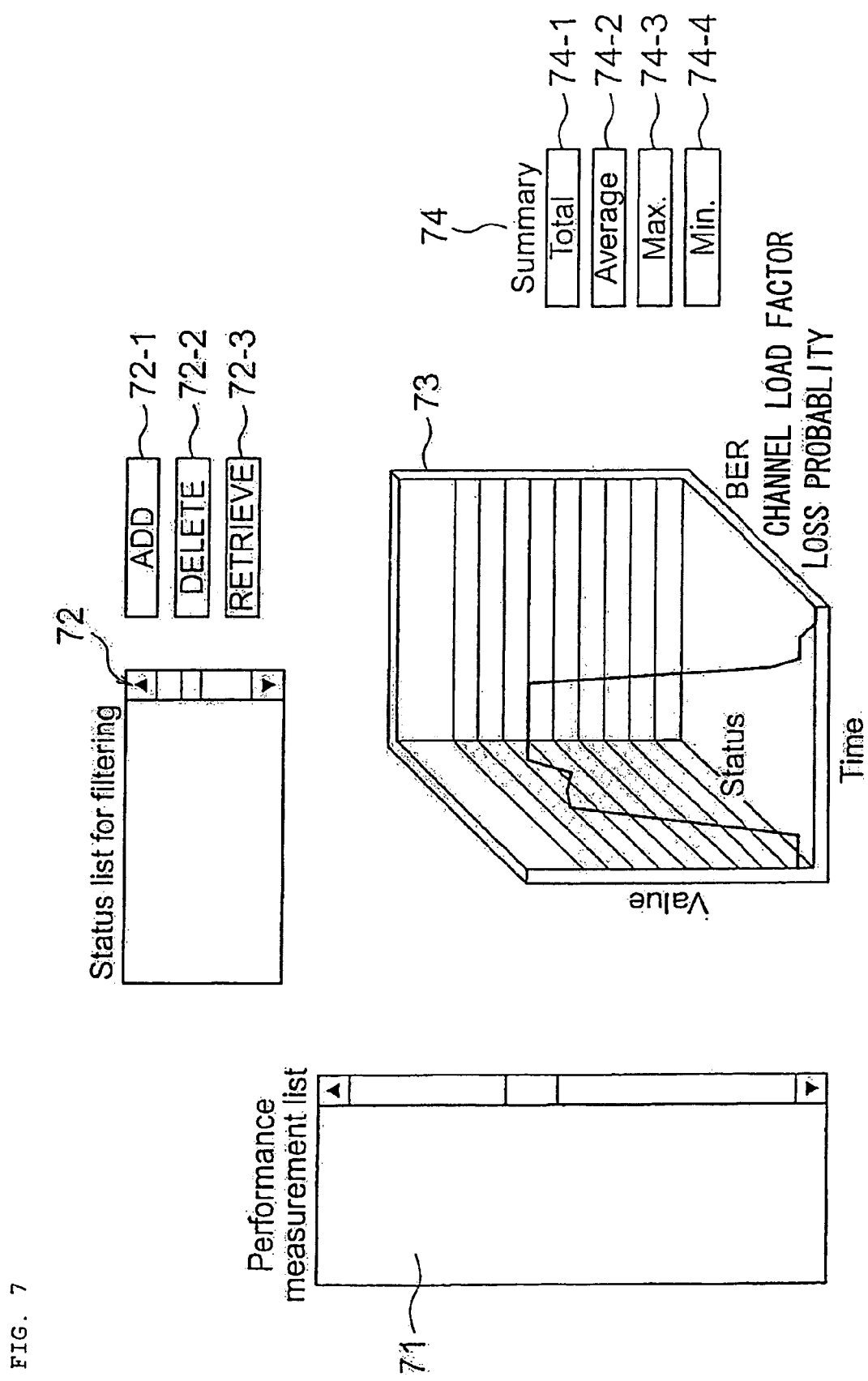
Figure 8:
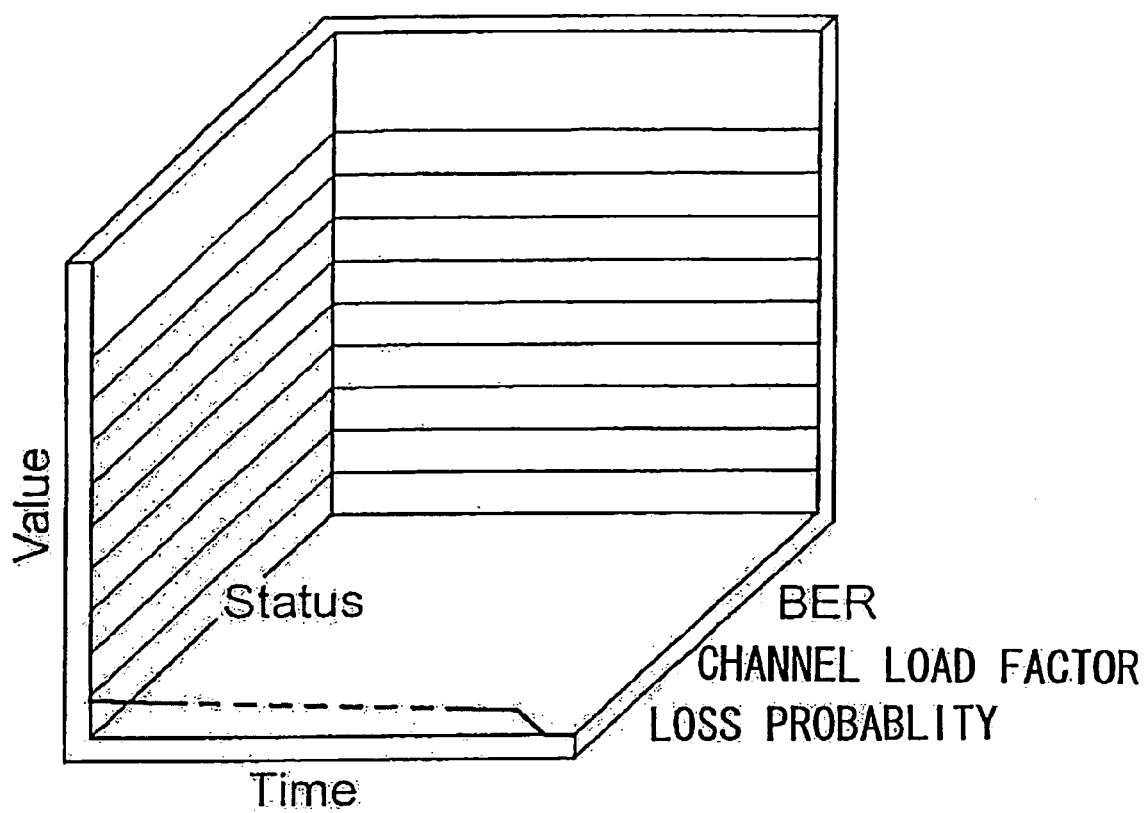

DESCRIPTION OF REFERENCE SIGNS 10 network monitoring device
11 data communication processing part
12 performance measurement database
13 status notification database
14 table
15 data extraction and aggregate processing means
16 extraction/aggregate data storing memory part
20-1, 20-2, 20-3 monitor terminal
21 extraction condition setting GUI part
30 Mobile Switching Center
50-1, 50-2, 50-3, 51-1, 51-2, 51-3, 52-1, 52-2, 52-3, 53-1, 53-2, 53-3 Node B
71 performance measurement data list
72 list of the status of the device to be eliminated
73 three dimensional graph
74 aggregate value display part

The invention claimed is:

1. A network monitoring system for monitoring a network comprising a plurality of devices, the network monitoring system comprising;
   extraction condition presenting means for presenting an extraction condition indicating a relationship between performance measurement data of at least one device among the plurality of devices and a given status of the at least one device among a plurality of statuses of the at least one device, the relationship indicating that the performance measurement data that are measured under the given status of the at least one device and transmitted from the at least one device under the given status are to be eliminated upon extracting performance measurement data of the plurality of devices from a performance measuring database; and
   performance measurement data extracting means for eliminating the performance measurement data of the at least one device, that are measured under the given status of the at least one device and transmitted from the at least one device under the given status, based on the extraction condition indicated by said extraction condition presenting means, and extracting the performance measurement data of the plurality of devices from the performance measuring database,
   wherein the extracted performance measurement data does not include the eliminated performance measurement data of the at least one device measured under the given status, and
   wherein said network monitoring system provides the extracted performance measurement data of the plurality of devices that is effective for improvement of the network performance to an operator monitoring the network.

2. A network monitoring system for monitoring performance of a network comprising a plurality of devices on the basis of performance measurement data and status notification data that are transmitted from the plurality of devices of said network, comprising a monitor terminal of an operator who monitors said network and a network monitoring device that is connected to said network;
   wherein said network monitoring device comprises:
      data communication processing means for enabling communication with the plurality of devices and communication with said monitor terminal of the operator;
      performance measuring database for storing the performance measurement data of the plurality of devices that are received via said data communication processing means;
      status notification database for storing the status notification data of the plurality of devices that are received via said data communication processing means;
      a table for indicating an extraction condition; and
      extraction and aggregate processing means for extracting the performance measurement data from said performance measurement database on the basis of the extraction condition indicated on said table with reference to said status notification database, performing aggregate processing of the extracted performance measurement data, and transmitting the extracted performance measurement data and the aggregate processing data to said monitor terminal via said data communication processing means, wherein the extraction condition indicates a relationship between performance measurement data of at least one device among the plurality of devices and a given status of the at least one device among a plurality of statuses of the at least one device, the relationship indicating that the performance measurement data that are measured under the given status of the at least one device and transmitted from the at least one device under the given status are to be eliminated upon the extraction of the performance measurement data of the plurality of devices by the extraction and aggregate processing means, and wherein when the performance measurement data of the plurality of devices are extracted, the performance measurement data of the at least one device, that are measured under the given status of the at least one device and transmitted from the at least one device under the given status, are eliminated and not included in the extracted performance measurement data of the plurality of devices.

3. The network monitoring system according to claim 2, wherein said predetermined extraction condition is presented on said monitor terminal and is set or changed by the operator; said predetermined extraction condition that is set or changed by the operator is transmitted to said network monitoring device from said monitoring terminal via said data communication processing means; and said predetermined extraction condition that is set or changed by the operator is stored in said table.

4. The network monitoring system according to claim 2, wherein said aggregate processing data includes temporal change of the extracted performance measurement data; said data communication processing means transmits the temporal change of said performance measurement data and a status of a corresponding device among the plurality of devices to said monitoring device; and said monitoring device presents the transmitted temporal change of said performance measurement data and the transmitted status of the corresponding device to the operator.

5. The network monitoring system according to claim 4, wherein said aggregate processing data includes aggregate data including at least one of total, average, the maximum value, and a minimum value of said extracted performance measurement data; said data communication processing means transmits said aggregate data to said monitoring device in addition to the temporal change of the performance measurement data and the status of the corresponding device; and said monitoring device presents the temporal change of the performance measurement data, the status of the corresponding device, and the aggregate data, which are transmitted, to the operator.

6. The network monitoring system according to claim 1, wherein, when the performance measurement data of the plurality of devices are extracted, the performance measurement data of the plurality of devices include performance measurement data measured in at least one status of the at least one device which is not the given status among the plurality of statuses of the at least one device.

7. The network monitoring system according to claim 2, wherein, when the performance measurement data of the plurality of devices are extracted, the performance measurement data of the plurality of devices include performance measurement data measured in at least one status of the at least one device which is not the given status among the plurality of statuses of the at least one device.

8. The network monitoring system according to claim 1, the extraction condition presenting means provides a user interface in which the given status is deleted or changed to another status among the plurality of statuses, or additional statuses among the plurality of statues are added to indicate performance measurement data that are measured under the additional statuses of the at least one device and transmitted from the at least one device under the given status are to be eliminated upon the extracting the performance measurement data of the plurality of devices from the performance measuring database.

9. The network monitoring system according to claim 2, the extraction condition presenting means provides a user interface in which the given status is deleted or changed to another status among the plurality of statuses, or additional statuses among the plurality of statues are added to indicate performance measurement data that are measured under the additional statuses of the at least one device and transmitted from the at least one device under the given status are to be eliminated upon the extracting the performance measurement data of the plurality of devices from the performance measuring database.

10. The network monitoring system according to claim 1, wherein the plurality of devices comprise a mobile switching center (MSC), a plurality of radio network controllers (RNCs) and a plurality of Node Bs,
wherein the MSC is connected to the plurality of RNCs and each of the plurality of RNCs is connected to at least one Node B among the plurality of Node Bs,
wherein the given status is at least one of a lost of a signal status in which a signal is not supplied to an RNC among the plurality of RNCs, a lost of a frame status in which a frame is lost in the signal supplied to the RNC, a status in which a virtual path alarm indication signal is not received at the RNC, and a status in which a link of Access Link Control Application part (ALCAP) of a signaling is disconnected at the RNC, and
wherein the eliminated performance measurement data are at least one of a value indicating loss probability and a value indicating a channel load factor.

11. The network monitoring system according to claim 2, wherein the plurality of devices comprise a mobile switching center (MSC), a plurality of radio network controllers (RNCs) and a plurality of Node Bs,
wherein the MSC is connected to the plurality of RNCs and each of the plurality of RNCs is connected to at least one Node B among the plurality of Node Bs,
wherein the given status is at least one of a lost of a signal status in which a signal is not supplied to an RNC among the plurality of RNCs, a lost of a frame status in which a frame is lost in the signal supplied to the RNC, a status in which a virtual path alarm indication signal is not received at the RNC, and a status in which a link of Access Link Control Application part (ALCAP) of a signaling is disconnected at the RNC, and
wherein the eliminated performance measurement data are at least one of a value indicating loss probability and a value indicating a channel load factor.

* * * * *